United States Patent [19]
Kloeppel et al.

[11] Patent Number: 6,121,703
[45] Date of Patent: Sep. 19, 2000

[54] FLUID DYNAMIC BEARING MOTOR DESIGN FOR MOUNTING A ROTATING SHAFT DIRECTLY INTO A BASE CASTING

[75] Inventors: Klaus D. Kloeppel, Watsonville; Anthony J. Aiello, Aptos; Steven C. Knoche, Corralitos, all of Calif.

[73] Assignee: Seagate Technology, Inc., Scotts Valley, Calif.

[21] Appl. No.: 09/107,259

[22] Filed: Jun. 30, 1998

[51] Int. Cl.[7] .............................. H02H 7/00; F16C 32/00
[52] U.S. Cl. ..................... 310/90; 310/67 R; 384/112; 384/123; 384/121
[58] Field of Search ......................... 310/90, 91, 67 R; 384/121, 123, 107, 115, 112, 113, 292, 368; 29/596, 598, 525

[56] References Cited

U.S. PATENT DOCUMENTS

| | | | |
|---|---|---|---|
| 3,870,382 | 3/1975 | Reinhoudt | 308/9 |
| 5,559,382 | 9/1996 | Oku et al. | 384/90 |
| 5,577,842 | 11/1996 | Parsoneault et al. | 384/114 |
| 5,653,540 | 8/1997 | Heine et al. | 384/123 |
| 5,666,716 | 9/1997 | Parsoneault et al. | 29/596 |
| 5,678,929 | 10/1997 | Parsoneault et al. | 384/112 |
| 5,795,074 | 8/1998 | Rahman et al. | 384/123 |

*Primary Examiner*—Nestor Ramirez
*Assistant Examiner*—Tran N Nguyen
*Attorney, Agent, or Firm*—Flehr Hohbach Test Albritton & Herbert LLP

[57] ABSTRACT

A fluid dynamic bearing including a sleeve and a counterplate captured within a shoulder on the sleeve and including a threaded mounting extension for mounting the assembly from a base or the like. A rotating shaft is incorporated within the sleeve; the shaft includes a thrust plate which rotates in a recess defined between the counterplate and the sleeve. To incorporate this assembly into a disc drive or the like, the threaded mounting extension only needs to be mounted within a base, with a nut screwed over the threaded mounting. The base typically includes a raised portion; the sleeve is cantilevered from this base for further stability and eliminate the possibility of vibration of the shaft and sleeve with rotation of the shaft. The end of the shaft distal from the threaded mounting supports a hub which in turn supports a backiron and magnet. The base supports a stator aligned with the magnet; energization of the stator will cause rotation of the hub and the shaft.

11 Claims, 4 Drawing Sheets

FLUID DYNAMIC BEARING MOTOR DESIGN FOR MOUNTING A ROTATING SHAFT DIRECTLY INTO A BASE CASTING

FIELD OF THE INVENTION

The invention relates to the field of hydrodynamic bearing assembly, and especially for an assembly incorporating a rotating shaft surrounded by a fixed sleeve.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such known in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several shortcomings. First is the problem of vibration generated by the balls rolling on the raceways. Ball bearings used in hard disk drive spindles run under conditions that generally guarantee physical contact between raceways and balls, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the data track density and the overall performance of the disc drive system.

Another problem is related to the application of hard disk drives in portable computer equipment and the resulting requirements for shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems. The reason for the popularity of the use of air is the importance of avoiding the outgassing of contaminants into the sealed area of the head disc housing. However, air does not provide the lubricating qualities of oil. Its low viscosity requires smaller bearing gaps and therefore higher tolerance standards to achieve similar dynamic performance.

Thus, in the case of a hydrodynamic bearing employing a liquid lubricant, the lubricating fluid itself must be sealed within the bearing to avoid loss of lubricant which results in reduced bearing load capacity. Otherwise the physical surfaces of the spindle and housing would contact one another, leading to increased wear and eventual failure of the bearing system. Equally seriously, the failure of such a seal or other effort to contain the lubricant within the bearing system would cause the entry of contaminants into the head disc region of the disc drive.

Typically, in the prior art, seals for sealing the fluid within the disc drive utilize a pressurized film on the surface of the liquid air interface. In the case of bearing assemblies which employ ferro-magnetic fluids, the seal is achieved by the means of a magnetic field established at each end of the bearing. However, such seals have not been demonstrated to be reliably effective over a long period of time.

Other obvious shortcomings include the fact that many prior art hydrodynamic bearing assemblies frequently require large or bulky structural elements for supporting the axial and radial loads, as such hydrodynamic bearings do not have the inherent stiffness which results from mechanical bearing assemblies. It is difficult to scale the structural support elements to fit within the smaller disc drive dimensions currently in consumer demands. In other instances, hydrodynamic bearing assemblies suffer from the disadvantages of requiring extremely tight clearances and alignments; this burden makes it difficult to manufacture such assemblies since even a small deviation or aberration can lead to faulty bearings.

Another difficulty with assembly of known hydrodynamic bearing systems is that an essential part of the bearing is the formation of patterns of grooves on one of the two facing surfaces which form the bearing. Such patterns or grooves are quite difficult to form, especially in designs where the grooves run all the way to the edge of a flat surface, or where the entire grooved surface must be an effective part of the bearing. The most common way to form these patterns is stamping or coining. Typically, especially at the edges of the pattern, stress raisers appear during the coining process, which interfere with the establishment of the desired pressure distribution patterns within the bearing.

In some hydrodynamic bearing designs, a thrust plate is utilized which extends perpendicular to the rotating shaft or surfaces. Such thrust plate has in the past frequently required a pattern of grooves on both sides. It is very difficult to stamp or groove a plate on both sides, much more difficult than to stamp the plate only on one side. Such stamping and grooving efforts can again lead to distortions in the thrust plate or stress ridges on the surface of the thrust plate. Since hydrodynamic bearing assemblies suffer from the different disadvantages of requiring extremely tight clearances and alignments, such problems quickly lead to faulty bearings since even a small deviation or aberration in the formation of the groove or stamping of the thrust plate can impose sufficient distortion to overcome the narrow margins or clearances which are allowed for assembly and operation.

Most known hydrodynamic bearing designs are based on a fixed shaft and rotating surrounding sleeve. However, by switching to a rotating shaft, significant improvements in power consumption and vibration response could be achieved with no trade-offs in performance. The power consumption would be decreased by using a smaller diameter shaft which is allowed when the vibration performance becomes less dependent on the shaft stiffness as occurs when the sleeve is stationary and cantilevered or supported from the base.

The vibration performance could also be improved significantly in a rotating shaft design when the angular stiffness of the base-shaft system increases when it is replaced by a base-sleeve system. The sleeve cantilevered from the base has a much higher angular stiffness than the shaft cantilevered from the base as is readily apparent from a study of any of the figures of the present design. Therefore, the adoption of an easily assembled rotating shaft design is highly desirable.

SUMMARY OF THE INVENTION

It is therefore an objective of the present invention to provide a hydrodynamic bearing which is simple in design and assembly, yet supports a rotating shaft within a fixed sleeve.

It is a further objective of the invention to provide a rotating shaft design which can be easily scaled for incorporation within an information storage unit such as a computer disc drive system.

Yet another objective of the invention is to provide a design which is assembled from a limited number of parts so that assembly time and cost is minimized, and the need for machining a number of parts to close tolerances is minimized.

Yet another objective of the invention is to provide a hydrodynamic bearing design utilizing a rotating shaft and a sleeve cantilevered from a base so that the diameter of the rotating shaft may be reduced, minimizing power consumption needed to rotate the shaft.

These and other objectives of the present invention are achieved in a fluid dynamic bearing including a sleeve and a counterplate captured within a shoulder on the sleeve and including a threaded mounting extension for mounting the assembly from a base or the like. A rotating shaft is incorporated within the sleeve; the shaft includes a thrust plate which rotates in a recess defined between the counterplate and the sleeve. To incorporate this assembly into a disc drive or the like, the threaded mounting extension only needs to be mounted within a base, with a nut screwed over the threaded mounting. The base typically includes a raised portion; the sleeve is cantilevered from this base for further stability and eliminate the possibility of vibration of the shaft and sleeve with rotation of the shaft. The end of the shaft distal from the threaded mounting supports a hub which in turn supports a backiron and magnet. The base supports a stator aligned with the magnet; energization of the stator will cause rotation of the hub and the shaft. Another option would be to have the stator assembled to the sleeve which is stationary.

Other features and advantages of the present invention will be apparent to a person of skill in the art who studies the description of a preferred embodiment given below in conjunction with the accompanying drawings.

DETAILED DESCRIPTION OF A PREFERRED EMBODIMENT

In the following description, a spindle motor incorporating a rotating shaft which carries a hub for supporting one or more discs, a design which is especially useful in a disc drive computer system is disclosed. The present invention modifies an existing fixed shaft design to make it very simple to incorporate a rotating shaft into a spindle motor, with the rotating shaft supporting the hub for rotation. Adopting this approach allows the sleeve to be fixed, and supported directly from the base as will be shown below. This means that the shaft can be made thinner, reducing the power requirements to rotate the shaft. Further, because the sleeve is supported from the base, the sleeve and shaft combination is very stable, reducing the likelihood of vibration in the system.

Figure 1:
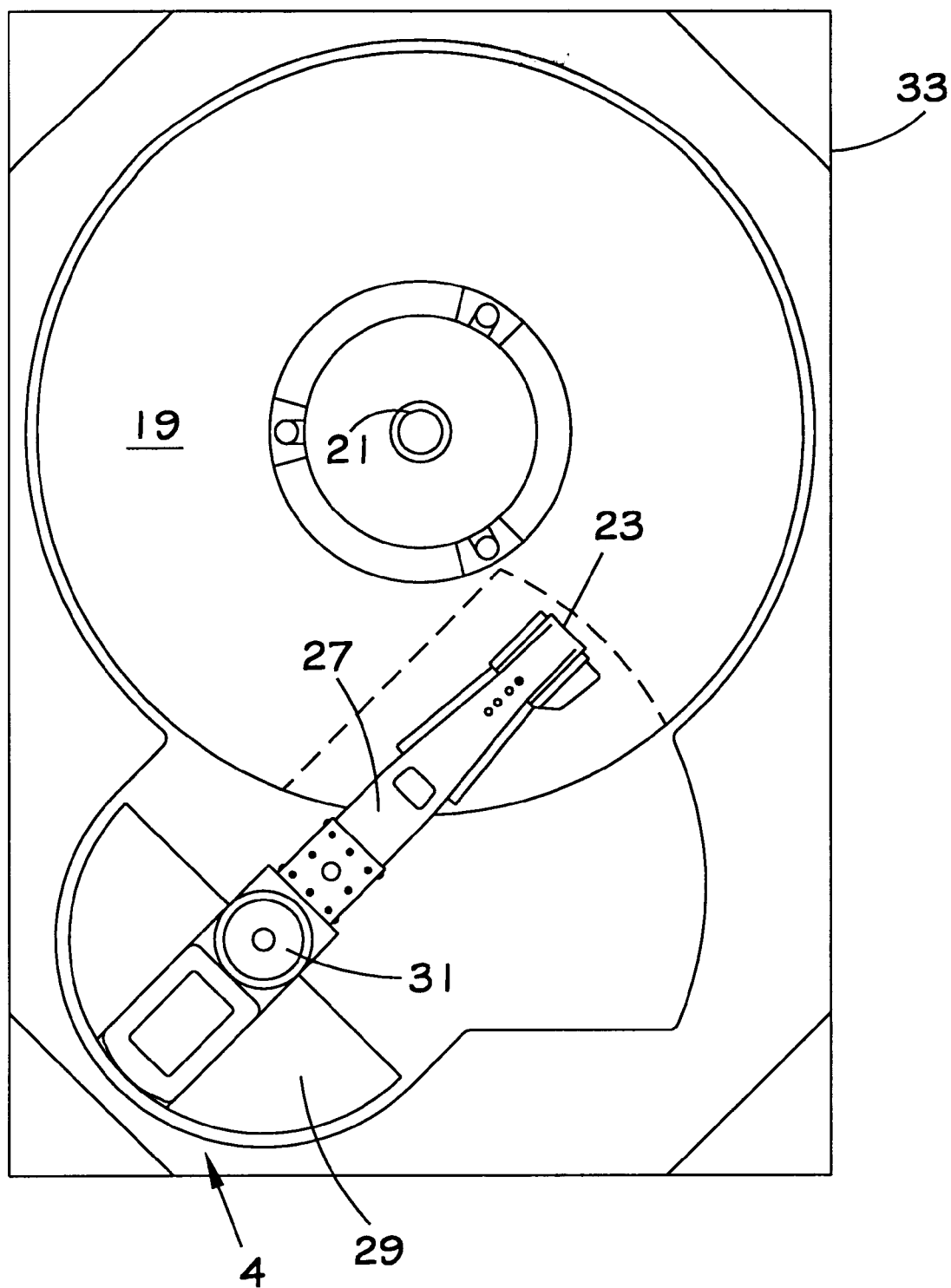
FIG. 1 is a top plan view of a known disc drive in which a motor incorporating the features of the present invention is useful.

A simple plan view of a disc drive of the type in which this motor is useful is shown in FIG. 1. This view illustrates the basic elements of the drive, including a rotating disc or discs 19, which are rotated by the spindle 21 of a spindle motor to be described in further detail below. As the discs rotate, a transducer 23 mounted on an end of an actuator arm 27, is selectively positioned by a voice coil motor 29 rotating about a pivot 31 to move the transducer 23 from track to track over the surface of the disc.

Figure 2:
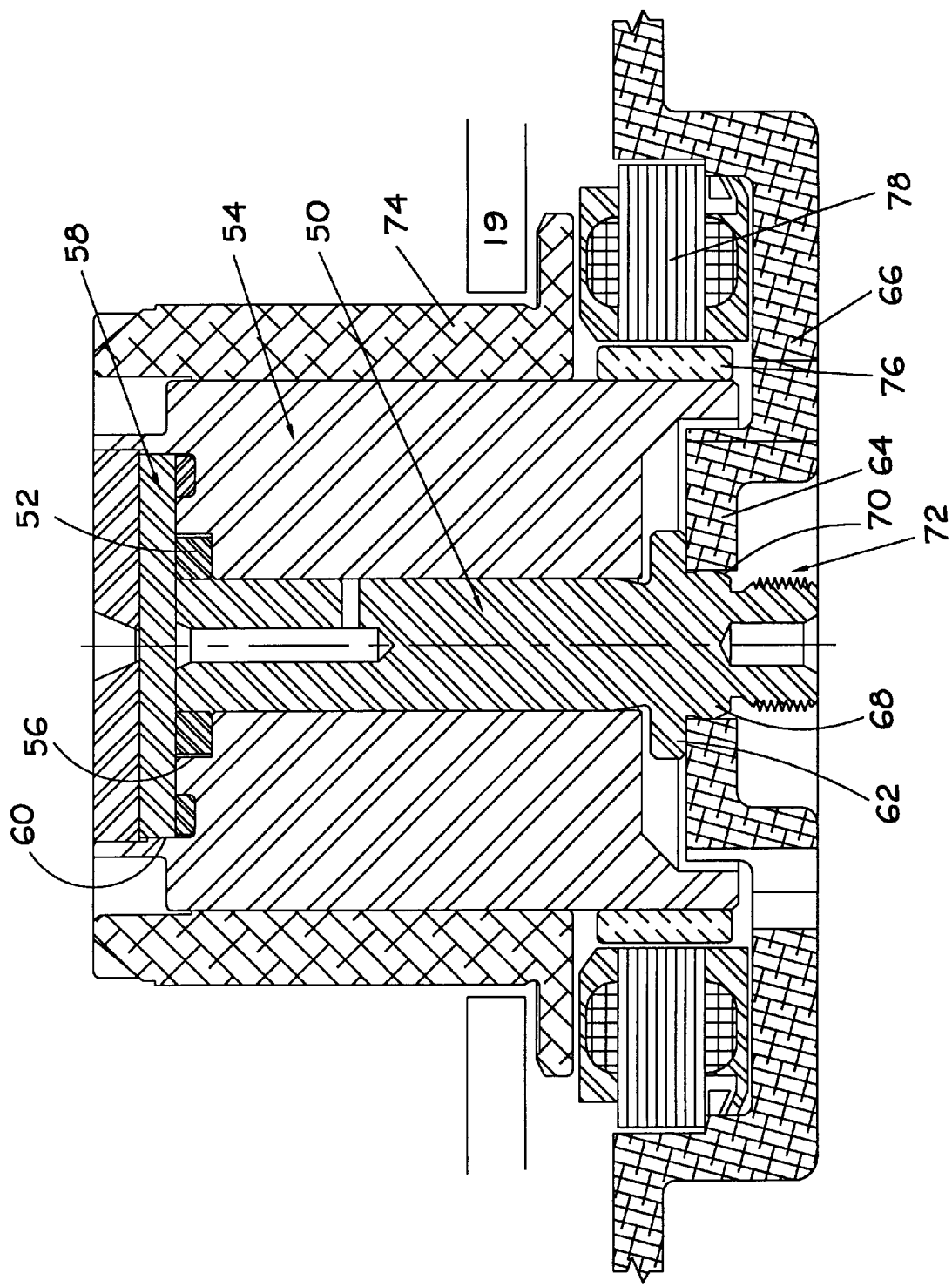
FIG. 2 is a vertical sectional view of a fluid dynamic bearing incorporated in a disc drive.

Thus FIG. 2 shows a spindle motor including a central fixed shaft 50 having a thrust plate 52 on one end. The shaft 50 is fixed relative to the rotating sleeve 54; the thrust plate 52 sits within a recess 56 defined by the sleeve 54 and a counterplate 58 supported on the sleeve 54. It can be seen that the counterplate 58 is fixed in place on the sleeve 54 by being pressed or similarly fixed inside a shoulder 60 on the hub 54. At the opposite end of the shaft 50, the shaft includes a shoulder 62 which rests on an upraised portion 64 of the base 66 in which the motor is mounted. A shaft extension 68 extends through an opening 70 in the base 66; and a threaded mounting end 72 of the shaft receives a nut (not shown) which fixes the shaft in place within the base. A hub 74 is supported on the outside of the sleeve 54, and a magnet 76 is located on the same surface of the sleeve and aligned with a stator 78 supported from the base casting 66. Energization of the stator establishes a field which interacts with the magnet 76 to cause rotation of the hub. One or more discs 19 are supported on the surface of the hub. It is readily apparent that because the transducer 23 flies closely over the surface of each disc 19, that it is very important that the motor and hub be very stable. In a fixed shaft design, to achieve this goal, a shaft 50 of substantial diameter must be used in fixed shaft designs. The present invention is intended to provide a motor which achieves the goals of the design of FIG. 2 while providing a rotating shaft and hub design wherein the size of the disc surface is optimized, while still providing a motor which is very stable and not susceptible to vibration. Further, the motor to be described with respect to FIG. 3 is simple to assemble, and incorporates a rotating shaft of relatively narrow diameter so that a minimal amount of power is used to spin the shaft and the hub it supports.

Figure 3:
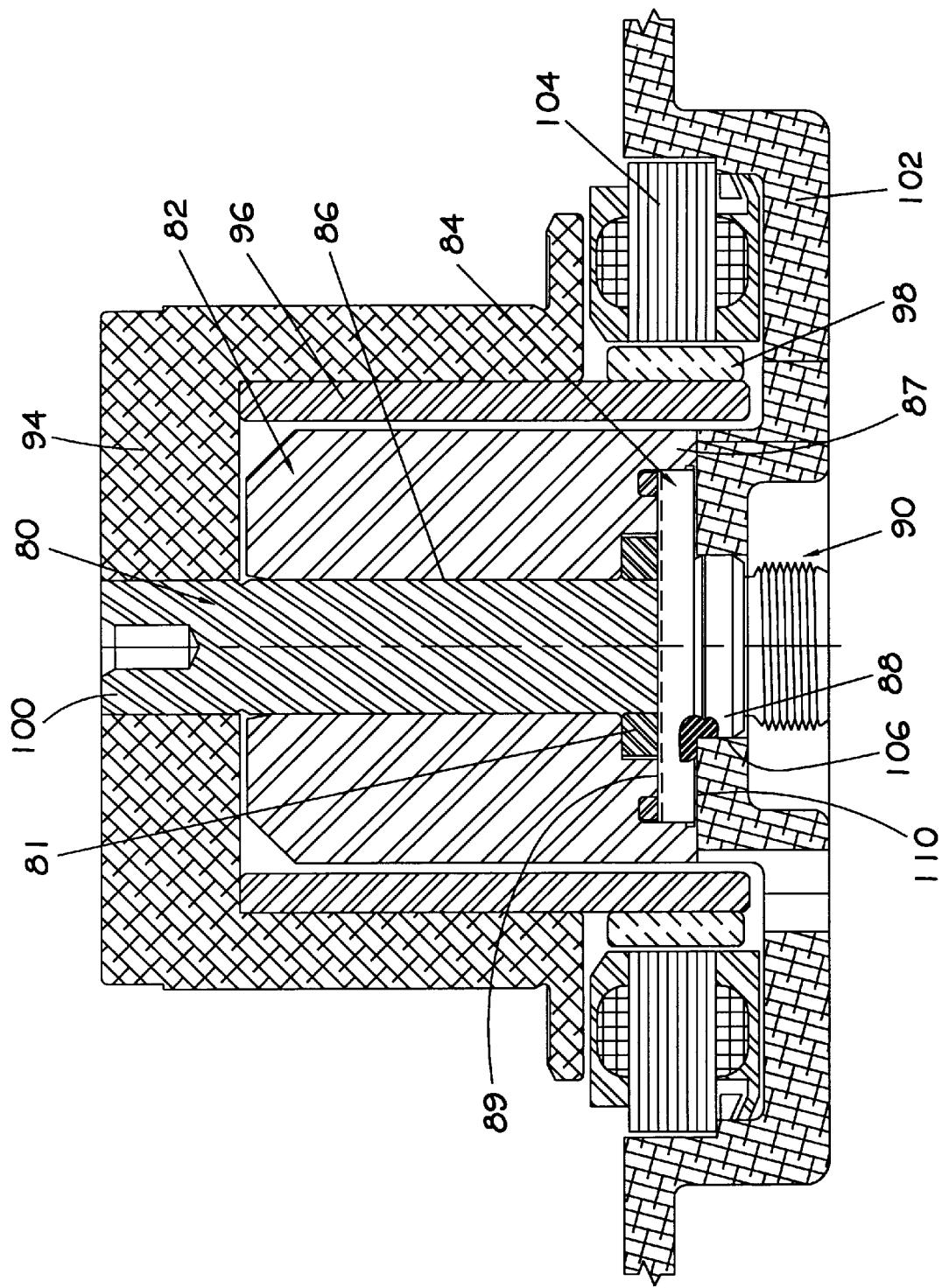
FIG. 3 is a vertical sectional view of a motor adapted for use in a disc drive and incorporating the features of the present invention.
Figure 4:
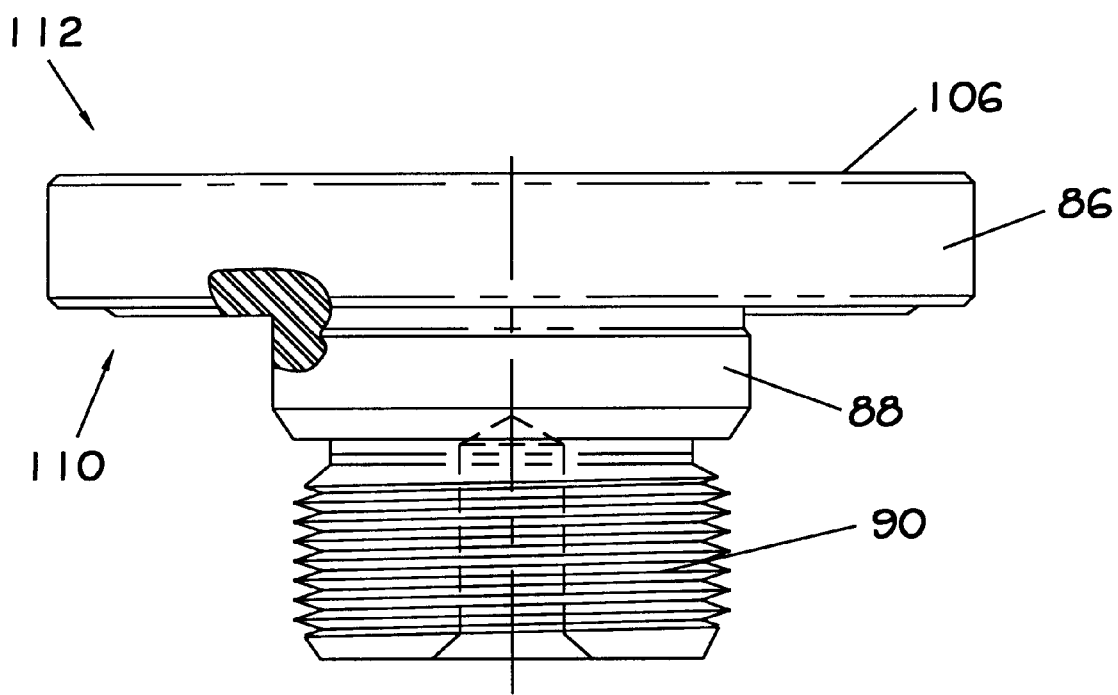
FIG. 4 is a vertical sectional view of the threaded counterplate used in the cartridge of this invention.

Referring specifically to FIG. 3, the design shown herein incorporates a rotating shaft 80 which rotates within a sleeve 82. The sleeve 82 cooperates with an integral, single piece threaded counterplate 84 (shown in FIG. 4) to define the chamber or gaps 86 within which the shaft 80 rotates. The threaded counterplate 84 includes in a single integrated piece a surface 89 which cooperates with surfaces of the thrust plate 81 to establish a fluid dynamic thrust bearing which supports the shaft 80 for rotation; an extension 88, and a threaded mounting end 90. A fluid dynamic journal bearing is established in the gap or chamber 86 between the sleeve 82 and the rotating shaft 80 and the thrust plate 81 supported on the shaft. The shaft 80 and thrust plate 81 are supported for rotation by fluid (gas or liquid) between the surfaces of the shaft and thrust plate, and the corresponding inner surfaces of the sleeve 82 and the threaded counterplate 84; these surfaces have patterns of grooves thereon to establish appropriate pressures in the fluid and support the shaft for rotation, all in accordance with the known technology in the field of fluid dynamic bearings.

To complete the motor of FIG. 3, the shaft, sleeve and counterplate assembly has a hub 94 which is preassembled with backiron 96 and magnet 98 is mounted on a first end 100 of the shaft 80. The assembled combination is then inserted in the base 102 which has already been assembled together with a stator 104. The threaded extension 90 extends through an opening 106 in the base, and a nut (not shown) is threaded on the extension 90 to fix the motor in place.

Of course, other means of attaching the mounting extension to the base are readily available, such as an interference fit, retaining clip or the like. It is also apparent that this motor can be easily accepted into existing designs which were established to accept stationary shaft fluid dynamic bearing motor. This goal is achieved by providing the integral, threaded counterplate shown in FIG. 4, which interfaces with the drive base to locate and tie down the motor. The upper surface 106 of the counterplate 86 is provided to face the base of the rotating shaft (if desired) as well as the facing surfaces of the thrust plate 81 so that the rotating shaft and thrust plate smoothly rotate over the surface of the counterplate.

As noted above, by adopting this rotating shaft design, the rotating shaft itself may be made thinner than the standard fixed shaft. This leads to a reduction in power consumption; it is readily apparent that since the sleeve 82 is not rotating, its shoulder 87 may rest directly on the base; also, the radial ends 112 of the counterplate 84 are supported by the shoulders 87 of the sleeve 82 and the radially extending outer surface 110 of the counterplate 86 rests on the base. Therefore, a very stable interface between the sleeve, counterplate and base is established. Therefore, the rotating shaft 80 which supports the hub 94 for rotation, can be made relatively thinner, because of the stiffness established by the base-sleeve system. The sleeve 82 being cantilevered from the base 102 has an inherently much higher angular stiffness than the shaft cantilevered from the base in a fixed shaft system.

Other features and advantages of the present invention may be apparent to a person of skill in the art who studies the present invention disclosure. Therefore, the scope of the present invention should be limited only by the following claims.

What is claimed is:

1. An improved spindle motor comprising:
   a rotating hub for supporting one or more discs in a disc drive, said hub being supported from one end of rotating shaft incorporated in a spindle motor, said motor comprising a fixed sleeve surrounding said shaft and defining a fluid dynamic journal bearing between facing surfaces of said shaft and said sleeve, a defining means supported from said sleeve and a base to define a fluid dynamic thrust bearing with said shaft to allow for rotation of said shaft relative to said defining means and said sleeve; and
   said defining means includes an integral extension extending through an opening in said base and a means for fastening said extension to said base.

2. A spindle motor as claimed in claim 1 wherein said defining means includes integral threaded mounting end for receiving a nut for fastening said extension to said base.

3. An improved spindle motor comprising:
   a rotating hub for supporting one or more discs in a disc drive, said hub being supported from one end of a rotating shaft incorporated in a spindle motor, said motor comprising a fixed sleeve surrounding said shaft and defining a fluid dynamic journal bearing between facing surfaces of said shaft and said sleeve, said sleeve being cantilevered from and supported on a base of said disc drive; and
   a threaded counterplate supported by said sleeve at radial ends of said counterplate and by said base at radially extending outer surfaces of said counterplate, said counterplate having a surface facing an end of said shaft to define a fluid dynamic thrust bearing with said shaft to allow for rotation of said shaft relative to said counterplate and said sleeve.

4. A spindle motor as claimed in claim 3 wherein said counterplate includes an integral extension extending through an opening in said base and an integral threaded mounting end for receiving a nut for fastening said extension to said base.

5. A spindle motor as claimed in claim 4 further comprising a thrust plate on a second end of said shaft and rotating in a recess defined by said sleeve and said counterplate and defining a portion of said fluid dynamic bearing between surfaces of said thrust plate, said sleeve and said counterplate to establish stable rotation of said shaft relative to said sleeve and said counterplate.

6. A spindle motor as claimed in claim 4 wherein said hub supports a backiron extending parallel to said sleeve and beyond a radial end of said hub defining a region where said discs are supported, said extension of said backiron beyond said hub supporting a magnet located to face a stator supported from said base to form said motor which causes rotation of said hub and said shaft relative to said sleeve and said base.

7. A spindle motor as claimed in claim 3 wherein said radial ends of said counterplate are fitted within a shoulder of said sleeve so that said counterplate is integrated with said sleeve to define a chamber for said shaft and said counterplate.

8. A spindle motor as claimed in claim 7 wherein the end of said shaft is parallel to said counterplate and separated by a gap from said counterplate so that a portion of said fluid thrust bearing is defined between said shaft and said counterplate.

9. A spindle motor as claimed in claim 8 wherein a thrust plate defines at least one radially extending surface parallel to said counterplate and being an extension of the end of said shaft and separated by a gap from said counterplate so that a portion of said fluid thrust bearing is formed between said counterplate, said end of said shaft and said thrust plate.

10. An improved spindle motor comprising:

a rotating hub for supporting one or more discs in a disc drive, said hub being supported from one end of a rotating shaft incorporated in a spindle motor, said motor comprising a fixed sleeve surrounding said shaft and defining a fluid dynamic journal bearing between facing surfaces of said shaft and said sleeve, and a threaded mounting defining means supported from said sleeve and a base to define a fluid thrust dynamic bearing with said shaft to allow for rotation of said shaft relative to said defining means and said sleeve.

11. A spindle motor as claimed in claim 10 wherein said rotating shaft includes a thrust plate at an end thereof facing said defining means to form at least a portion of said fluid thrust bearing.

* * * * *